Aug. 31, 1954 W. F. OWEN 2,687,570
APPARATUS FOR FREEING EXPANDED TUBES FOR SUBSEQUENT REMOVAL
Filed Aug. 14, 1951 2 Sheets-Sheet 1

Inventor
WHITNEY FINBARR OWEN
per Worth Wade
Attorney.

Patented Aug. 31, 1954

2,687,570

UNITED STATES PATENT OFFICE 2,687,570

APPARATUS FOR FREEING EXPANDED TUBES FOR SUBSEQUENT REMOVAL

Whitney Finbarr Owen, Copner, Portsmouth, England

Application August 14, 1951, Serial No. 241,853

6 Claims. (Cl. 30—91)

This invention relates to an improved apparatus for freeing a member from another or holding member for subsequent removal, for example boiler tubes which have been positioned by expanding, that is to say by a tube expander for expanding or increasing the diameter of tubes in their tube plates, but it is to be understood that the invention is applicable to screwed or threaded tubes and to sleeve members, solid stays and the like.

By the present invention there is provided an apparatus in which the length and depth of cut can be regulated in accordance with requirements.

The actual operation of cutting and removing the tube or the like, saves time over the usual methods employed and is economical in cost both in manufacturing the apparatus and in use. Moreover a sturdy apparatus is provided well capable of standing up to hard usage.

The apparatus is simple in design and easy to manipulate, and in operation the holding member from which the first member is freed is not damaged or mutilated in any way.

According to the present invention there is provided an apparatus for cutting a slot in a member to allow for subsequent removal thereof from a piece of work, comprising a block consisting of a hollow tubular part having bores of different diameters and a locating head adjacent the smaller bore, the wall of the tubular part having a slot, a longitudinal moving cutting component comprising a spindle housed within the block and a cutting element thereon normally projecting through the slot, a guide section on the spindle co-operating for a part of the cutting movement with guide means on the inner wall of the smaller bore, the spindle and the wall of the larger bore of the tubular part having clearance therebetween so that when the guide section on the spindle leaves the guide means on the inner wall of the smaller bore, the spindle at the end of the cutting stroke is free to cant whereby the cutting element thereon is withdrawn from its normal projecting cutting position and housed within the tubular part.

Thus applying the invention to an expanded tube which is freed for subsequent removal the cuts are made in a longitudinal direction of the wall of the tube. The cuts do not extend right through to the external or outer perimeter. As an example two parallel longitudinal cuts are made and on removal of the block and tool a fishback or fine edged tool is then used to coil the sectional portion of the tube between the cuts down inside the tube thus enabling the remainder of the wall of the tube adjacent the sectional portion to be closed in to allow of subsequent removal of the tube.

The cuts do not extend to the outer wall of the tube, so that in the case of threaded members the threads on the co-operating or holding member are not damaged.

The cutting component may be actuated by any suitable means, for example, by hand percussion or by a suitable percussion apparatus.

The accompanying drawings illustrate examples of the carrying into effect of the invention.

In the drawings:

Figs. 1 and 2 are respectively side elevations of a cutting component and block.

Fig. 3 a side elevation of the combined block and component, and

Fig. 4 a similar view but turned through 180°.

Fig. 8 is a plan view of a tube which has been cut showing the sectional portion coiled within the tube, and Fig. 9 a plan view of a combined cutting component and block suited for removing sleeves and the like.

Figure 1:
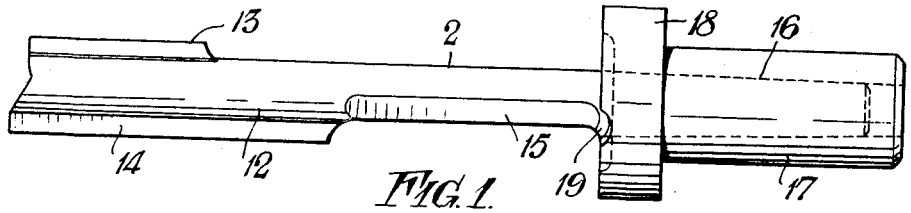
Figure 2:
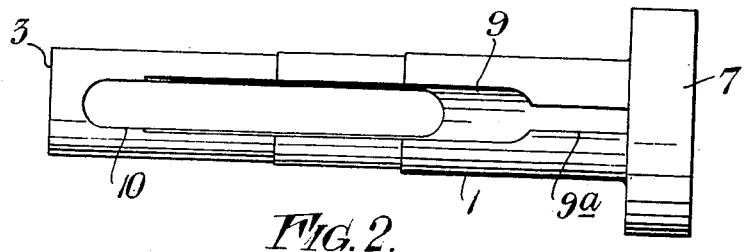
Figure 3:
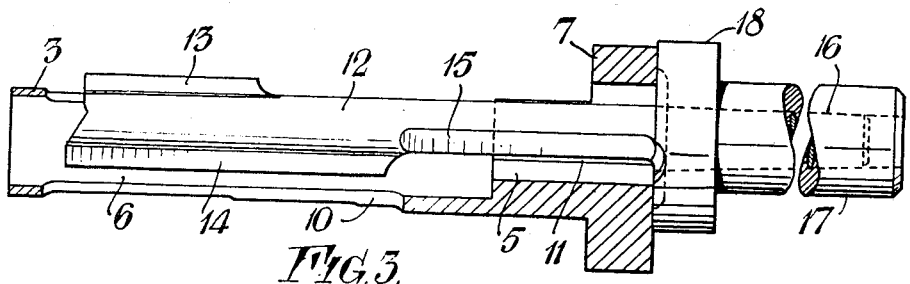
Figure 4:
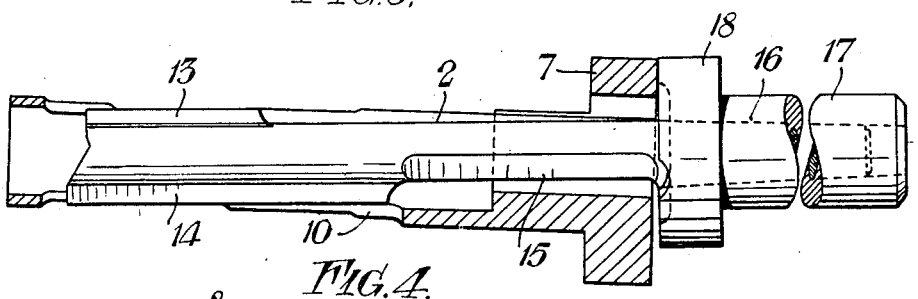
Figure 5:
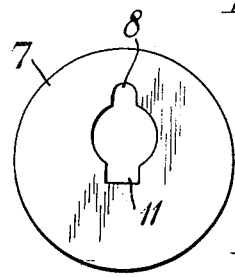
Fig. 5 is a plan view of the block with the cutting component removed.
Figure 10:
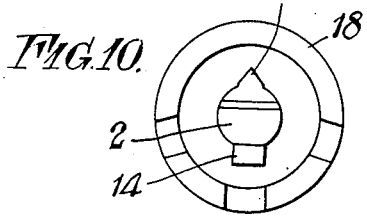
Fig. 10 is an under plan view of the cutting component shown in Fig. 1.

Referring to Figs. 1 to 5, in this construction the block is indicated by 1. This block serves as a mount and guide for the cutting component 2. The block 1 consists of a hollow tubular part 3 and a locating head 7. One way of making the block is to take a round steel bar which is turned to a convenient working diameter. Then a hole 5 or bore is formed partly therethrough from the top. A hole or bore 6 of larger diameter is then formed from the bottom to meet the first hole 5. Both holes are in alignment with the inside diameter of the tube to be extracted. Having drilled the holes, the block with the exception of a part at the top which forms a locating head 7, is turned down to fit inside the tube. When dealing with an expanded tube the head 7 rests on the bell-mouth of the tube.

This head 7 has a longitudinal groove 8 therein to allow the cutting component 2 to be inserted therethrough.

Within the wall of the tubular part 3 are two slots 9 and 10. The slot 9 is reduced in width at 9a and meets the groove 8 in the head. On the wall surrounding the hole 5, and in axial alignment with the centre line of the slot 10 there is formed a channel or groove 11 which serves as a guide for the cutting component 2. The edges of the slots 9 and 10 may be filed or ground back.

The spindle or mandrel 12 of the cutting component has a longitudinal cutting element or member 13 extending radially of the periphery of the spindle. At the opposite side of the spindle is an upstanding part or guide section 14 which slides in the guide channel 11. A clearance section at the end of the part 14 is indicated by 15. At the top of this the spindle 12 has a standard taper shank 16 fitting a socket part 17. The socket part 17 has a collar 18.

In operation, and dealing with an expanded tube, the block is inserted in the tube until the lower face of the head abuts against the bellmouth of the expanded tube. The cutting component is now inserted in the block and upon application of a force given by a suitable percussion tool, the cutting component is driven through the block and a longitudinal cut made in the wall of the tube.

Means on the spindle of the cutting component such as a stop 19 engages the upper face of the head 7 to control the downward movement of the cutting component and thus the length of cut made.

It will be noted that the cutting element 13 normally extends beyond the outer wall of the tubular part 3. To make a second cut the block must now be turned. To do this the cutting element 13 must come out of the longitudinal cut it has made. To allow the cutting element to leave the cut, which withdrawal in the case of an expanded tube is effected by the pressure exerted by the wall of the tube, there must be clearance between the cutting tool and the block.

There is a certain amount of play between the internal wall of the block and the external wall of the cutting element. At the end of the cutting stroke the guide section 14 has left the guide channel 11. In this position the spindle 12 of the cutting component is allowed to cant sufficiently to enable the cutting element to come out of the longitudinal cut and to be housed within the tubular part 3. The cut-a-way part or slot 10 allows the canting movement to take place, since the guide section 14 moves into the slot 10 a sufficient amount, but not far enough to extend beyond the external wall of the tubular part 3. The block and cutter are now withdrawn and the block positioned for the second cut.

The position of this second cut may already have been marked on the tube, and the block may have registering marks thereon so that no delay is caused in determining the correct positioning of the second cut in respect to the first cut. These registering marks may be by way of hacksaw cuts. In actual practice a skilled workman can determine the respective positions of the cuts without having resource to any previous registration.

After withdrawal of the cutter and block from the tube when the second cut has been made, a suitable tool is used to coil down the portion or section 20 of the tube wall between the two cuts.

The bell-mouth portion of the tube is not cut by the cutting tool. This portion may be nicked with a chisel opposite both cuts, and subsequently removed. The ends of the tubes may be previously cut off close to the water pockets or other holding members.

More than two longitudinal cuts may be made.

Figure 8:
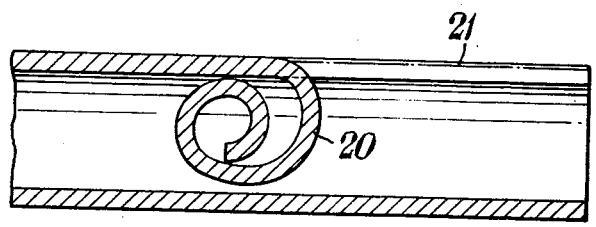

In Fig. 8 the line 21 indicates the radial depth of the cut, from which it will be seen that the cut does not extend to the outer wall of the tube.

The longitudinal cuts extends the length of the expanded or screwed portion of the tube, or they may be somewhat shorter or somewhat longer thereof.

Figure 6:
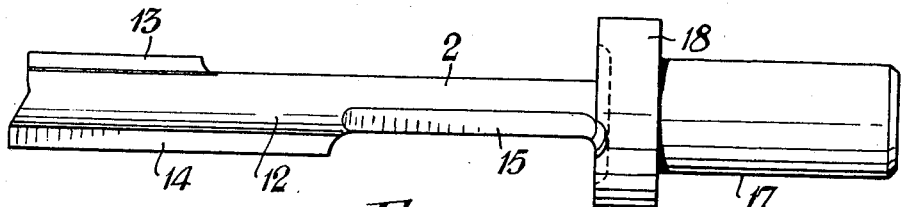
Fig. 6 is a modified form of cutting component.

Fig. 6 shows a similar cutting component to that of Figs. 1 to 5, but modified to the extent that it is made in one piece.

Figure 7:
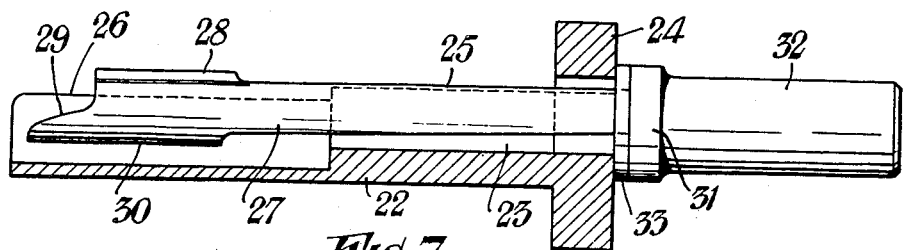
Fig. 7 is a side elevation of a further example of cutting component and block.

Fig. 7 illustrates a further example of combined block and cutting component. In this construction the block consists of a hollow tubular part 22 having two holes drilled therein, the hole of lesser diameter forming a guide 23, and a locating head 24. The head 24 has a longitudinal groove to allow the cutting component to be inserted therethrough. Within the wall of the tubular part 22 is a slot the lesser width 25 of which is opposite the guide 23. This lesser width merges into a wider width 26 extending to the end of the tubular part.

The spindle or mandrel 27 has a cutting element 28 extending from a clearance 29. At the opposite side there is a guide section 30. A collar 31 is provided, beyond that a shank 32 of standard configuration. At the lower end of the collar 31 is a resilient member 33 which acts as a cushioning member between the collar 31 and the head 24.

When the cutting element passes from the part 25 into the part 26 the guide section 30 is also free from the guide 23 so that the cutter 28 withdraws from the cut made and is housed within the confines of the internal wall of the lower end of the tubular part 22 so that the block can be removed and turned to make another cut.

It is to be understood that the apparatus can be used for cutting other work than expanded tubes, amongst which may be mentioned the screwed ends of steam or smoke pipes, solid stays and also sleeves.

Figure 9:
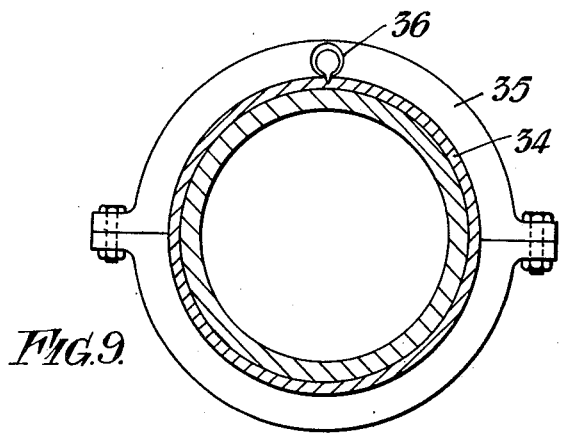

In the case of sleeves the longitudinal cuts would be made externally. Fig. 9 shows in plan an apparatus for this purpose. The sleeve is indicated by 34. Clamped around the sleeve is a member 35 carrying a combined block and cutting component 36 adapted to make external longitudinal cuts in the said sleeve. More than one combined block and cutting component may be incorporated.

With solid stays, these would first be drilled centrally.

Joggled apparatus may be made where direct access to the work is not available, for example, in the case of small headers.

With tubes that are bell-mouthed, the latter may be cut off close to the water pockets before the apparatus is used.

The combined block and tube will be made in various sizes to suit the work to be dealt with. It can be made conformable with standard machine tool practice as to length and diameters.

It will be apparent that the invention can be variously modified and changed within the scope of the claims.

I claim:

1. Apparatus for cutting a slot in a member to allow for subsequent removal thereof from a piece of work, comprising a block consisting of a hollow tubular part having bores of different diameters and a locating head adjacent the smaller bore, the wall of the tubular part having a slot, a longitudinal movable cutting component comprising a spindle working within the block, a cutting element on said spindle normally projecting through said slot, a guide section on said spindle co-operating with guide means on the inner wall of the smaller bore, the spindle and the wall of the larger bore of the tubular part having clearance therebetween so that when the guide section on the spindle leaves the said guide means on the inner wall of the smaller bore, the spindle at the end of the cutting stroke is free to cant whereby the cutting element thereon is withdrawn from its normal projecting cutting position and housed within the tubular part.

2. Apparatus for cutting a slot in a member to allow for subsequent removal thereof from a piece of work, comprising a block consisting of a hollow tubular part having bores of different diameters and a locating head adjacent the smaller bore, the wall of the tubular part having diametrically opposed slots, a longitudinal movable cutting component comprising a spindle working within the block, a cutting element on said spindle normally projecting through one of said slots, a guide section on said spindle co-operating with guide means on the inner wall of the smaller bore, the spindle and the wall of the larger bore of the tubular part having clearance therebetween so that when the guide section on the spindle leaves the said guide means on the inner wall of the smaller bore, the spindle at the end of the cutting stroke is free to cant whereby the cutting element thereon is withdrawn from its normal projecting cutting position and housed within the tubular part with the guide section on said spindle projecting into the other slot in the wall of the tubular part.

3. Apparatus for cutting a slot in a member to allow for subsequent removal thereof from a piece of work, comprising a block consisting of a hollow tubular part having bores of different diameters and a locating head adjacent the smaller bore, the wall of the tubular part having diametrically opposed slots, a longitudinal movable cutting component comprising a spindle, a taper shank thereon, a socket part into which said taper shank fits, a collar on said socket part engaging the locating head, said spindle working within the block, a cutting element on said spindle normally projecting through one of said slots, a guide section on said spindle co-operating with guide means on the inner wall of the smaller bore, the spindle and the wall of the larger bore of the tubular part having clearance therebetween so that when the guide section on the spindle leaves the said guide means on the inner wall of the smaller bore, the spindle at the end of the cutting stroke is free to cant whereby the cutting element thereon is withdrawn from its normal projecting cutting position and housed within the tubular part.

4. Apparatus for cutting a slot in a member to allow for subsequent removal thereof from a piece of work, comprising a block consisting of a hollow tubular part having bores of different diameters and a locating head adjacent the smaller bore, the wall of the tubular part having a slot, a longitudinal movable cutting component comprising a spindle working within the block, a cutting element on said spindle normally projecting through said slot, a guide section on said spindle co-operating for a part of the cutting movement with guide means on the inner wall of the smaller bore, means on the spindle controlling the length of cut, the spindle and the wall of the larger bore of the tubular part having clearance therebetween so that when the guide section on the spindle leaves the said guide means on the inner wall of the smaller bore, the spindle at the end of the cutting stroke is free to cant whereby the cutting element thereon is withdrawn from its normal projecting cutting position and housed within the tubular part.

5. Apparatus for cutting a slot in a member to allow for subsequent removal thereof from a piece of work, comprising a block consisting of a hollow tubular part having bores of different diameters and a locating head adjacent the smaller bore, the wall of the tubular part having a slot, a longitudinal movable cutting component comprising a spindle, a collar thereon, a resilient member interposed between said collar and the locating head, the spindle working within the block, a cutting element on the spindle projecting through said slot, a guide section on said spindle co-operating for a part of the cutting movement with guide means on the inner wall of the smaller bore, the spindle and the wall of the larger bore of the tubular part having clearance therebetween so that when the guide section on the spindle leaves the said guide means on the inner wall of the smaller bore, the spindle at the end of the cutting stroke is free to cant whereby the cutting element thereon is withdrawn from its normal projecting cutting position and housed within the tubular part.

6. Apparatus for cutting a slot in a sleeve to allow for subsequent removal thereof from a piece of work, comprising a member adapted to be clamped around the sleeve, said member carrying a block consisting of a hollow tubular part having bores of different diameters and a locating head adjacent the smaller bore, the wall of the tubular part having a slot, a longitudinal movable cutting component comprising a spindle working within the block, a cutting element on said spindle normally projecting through said slot, a guide section on said spindle co-operating with guide means on the inner wall of the smaller bore, the spindle and the wall of the larger bore of the tubular part having clearance therebetween so that when the guide section on the spindle leaves the said guide means on the inner wall of the smaller bore, the spindle at the end of the cutting stroke is free to cant whereby the cutting element thereon is withdrawn from its normal projecting cutting position and housed within the tubular part.

References Cited in the file of this patent

UNITED STATES PATENTS

| Number | Name | Date |
| --- | --- | --- |
| 945,627 | Smith | Jan. 4, 1910 |
| 2,457,540 | Fasoldt | Dec. 28, 1948 |
| 2,502,711 | Evans | Apr. 4, 1950 |